May 24, 1960 R. K. LOCKHART 2,938,073

COLOR TELEVISION

Filed Oct. 19, 1955 2 Sheets-Sheet 1

INVENTOR.
Robert K. Lockhart
BY
[signature]
ATTORNEY

INVENTOR.
Robert K. Lockhart
BY
[signature]
ATTORNEY

United States Patent Office 2,938,073

Patented May 24, 1960

2,938,073

COLOR TELEVISION

Robert K. Lockhart, Moorestown, N.J., assignor to Radio Corporation of America, a corporation of Delaware Filed Oct. 19, 1955, Ser. No. 541,492

4 Claims. (Cl. 178—5.4)

The present invention relates to apparatus for obtaining improved modulation of the electron beam or electron beams in a kinescope.

The voltage required to drive an electron gun or guns in a kinescope will determine the requirements of the amplifiers and circuits which are used to apply the driving signals to the kinescope. Most kinescopes or cathode ray tubes, particularly of the type for reproducing images or patterns, require driving voltages of a magnitude comparable to the output signals of electron tubes having large plate voltage. Improved circuits for applying driving signals to the electron gun or guns of the kinescope which will either require less signal drive to provide the same beam current modulation or which will produce increased beam current modulation with the same signal drive, will provide simplification of the driving circuits and also decrease in the cost of the driving circuits.

In color television where a plurality of electron guns are used in a color kinescope, the problem of driving the electron guns of the kinescope is even more complex. In some color television receiver circuits, a pair of color television signals are applied to each electron gun, namely, a luminance signal and a color difference signal. The luminance signal is normally applied to the cathode of the electron gun with the color difference signal applied to the first control electrode of that gun. However, the efficiency of the modulation of the electron beam as a result of a signal applied to the cathode is substantially greater than the efficiency of the modulation of the electron beam as a result of a signal applied to the first control electrode. The signal amplifiers driving the first control electrodes of the electron guns in the color kinescope must have greater drive to produce beam modulations of comparable amplitude with respect to those modulations resulting from the signal amplifier driving the cathode.

It is an object of this invention to provide an improved means for increasing the beam modulation due to a driving signal applied to a control electrode of the electron gun of a cathode ray image reproducing device.

It is another object of this invention to provide a means for driving the electron guns of a color kinescope which reduces the drive required of the color difference signal kinescope-driving circuits.

It is a still further object of this invention to provide means to increase the beam current modulation swing in each electron gun of a color kinescope due to color difference signal information applied to that electron gun.

According to the invention, increased swing of beam current modulation from an electron gun in a kinescope is achieved by impressing signal information on both the first control electrode and a second control electrode, such as a screen grid. In one form of the invention as applied to color kinescopes of the type used for color reproduction, the luminance signal is applied to each cathode of a plurality of electron guns, and each color difference signal is applied to both the first control electrode and the second control electrode, namely, the screen grid of the corresponding electron gun.

Other and incidental objects of this invention will become apparent upon a reading of the following specification and a study of the figures, wherein.

Figures 1, 2:
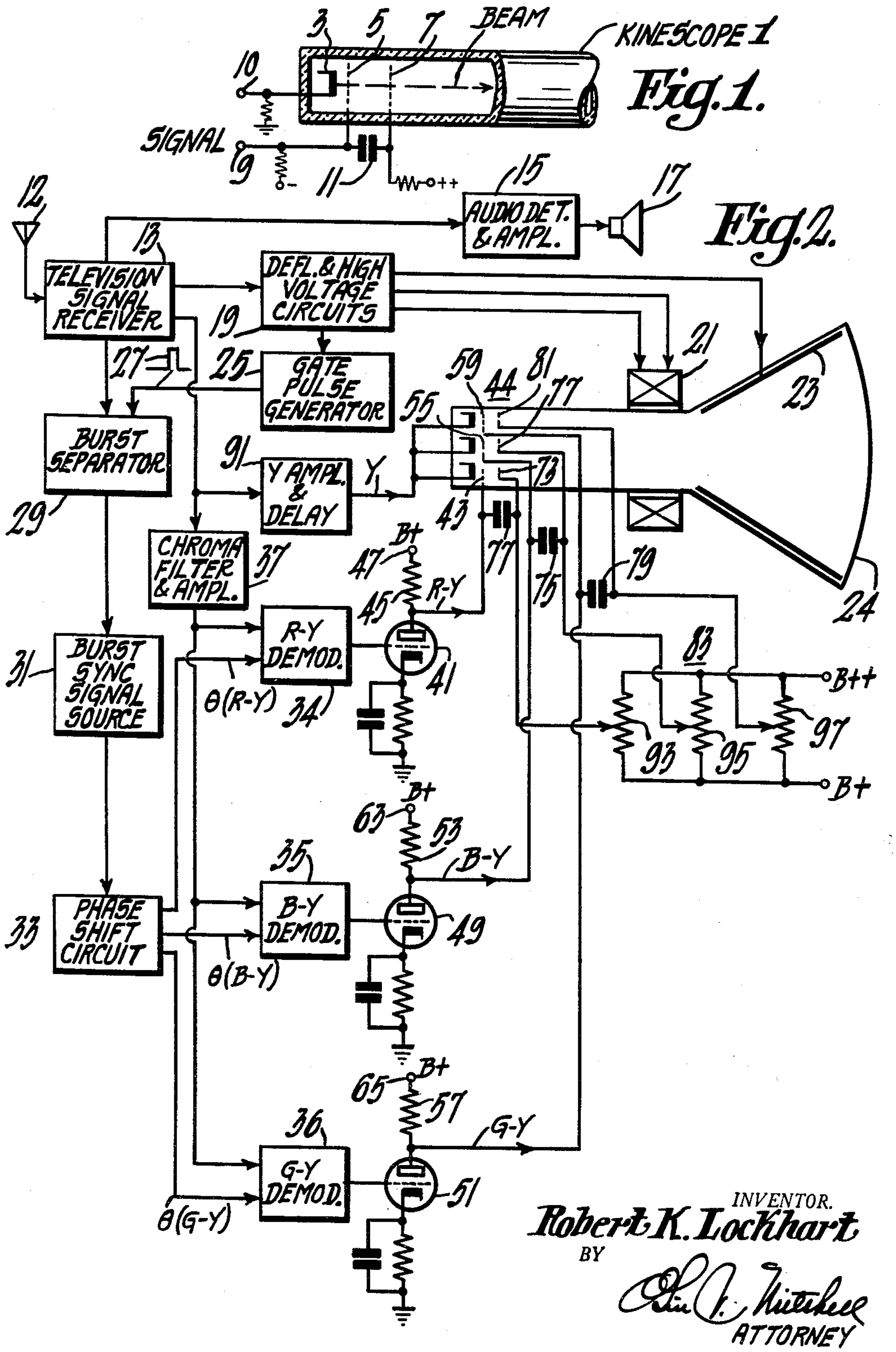
Figure 1 is a diagram of an electron flow device in a kinescope employing the present invention.
Figures 2 and 3 are diagrams of a color television receiver employing the present invention for applying color difference signals to a kinescope.

Figure 1 shows a view of the neck of a kinescope 1, including a cathode 3, a first control electrode 5 and a second control electrode 7, of an electron gun utilized to furnish an electron beam in the kinescope 1. It is to be appreciated that the electron gun, of which the aforementioned gun elements are components, may include more elements than those previously described. A driving signal applied to the first control electrode 5 by way of input terminal 9 will introduce modulations representative of the driving signal into the electron beam. These modulations will be in one polarity. The same driving signal, if applied to the cathode 3 by way of terminal 10, will introduce modulations into the electron beam representative of the driving signal in another polarity. The driving signal applied to the cathode 10 will produce modulations of greater intensity in the electron beam than the same driving signal applied to the first control electrode 5. In some types of kinescopes this difference is amplitude of beam modulation may be of the order of from 30 to 50%. The introducing of modulations into the electron beam by means of control electrodes other than the cathode may be made more effective by coupling the driving signal to not only the first control electrode 5 but also to the second control electrode 7. In some types of kinescopes, the second control electrode 7 will be the screen grid of the electron gun. A.-C. coupling of the driving signal between the first and second control electrodes 5 and 7 may be accomplished by way of the condenser 11. The applying of the driving signal therefore to both the first control electrode 5 and the second control electrode 7 will provide an increase of from 30 to 50% in the amplitude of the modulations introduced into the electron beam as compared to the condition where the driving signal is applied only to the first control electrode 5.

Consider the overall operation of the color television receiver of Figure 2 using the present invention. The incoming signal from the broadcast transmitter is received by the antenna 12 and applied to the television signal receiver 13. The television signal receiver 13 includes circuits for first detection, intermediate frequency amplification and second detection, and produces a demodulated color television signal. The demodulated color television signal includes a luminance signal, a chrominance signal which contains modulations representative of color difference signal information which may be demodulated by synchronous detection, picture deflection signals, color synchronizing bursts which convey reference phase information for use in synchronous detection, and a frequency modulated sound carrier transmitted 4½ mcs. removed from the picture carrier.

The sound information in the frequency modulated sound carrier is detected from the color television signal by the audio detector and amplifier 15, using, for example, a carrier sound circuit. The detected audio information is thereupon amplified and applied to the loud speaker 17.

The picture deflection signals are separated from the color television signal in the deflection and high voltage circuits 19 wherein are produced horizontal and vertical synchronizing signals which are applied to the yokes 21. The deflection and high voltage circuits also generate a high voltage which is applied to the ultor 23 of the color kinescope 3 in addition to energizing the gate pulse generator 25. The gate pulse generator 25 may be a multivibrator responsive to horizontal synchronizing pulses or may be an auxiliary winding on the high voltage transformer of the high voltage circuits; its function is to provide pulses 27 during the horizontal retrace interval. The duration time of each pulse 27 substantially coincides with the duration time of each color synchronizing burst which is transmitted on the "back porch" of the horizontal synchronizing pulses. The color television signal and the pulses 27 are applied to the burst separator 29 which separates the color synchronizing bursts from the color televison signal and applies the separated bursts to the burst synchronized signal source.

The burst synchronized signal source may be a ringing circuit, an injection locked oscillator or a resistance tube controlled oscillator. Using one or more circuits characteristic of these types of signal sources, a reference signal is developed having a phase accurately synchronized with respect to the phase information conveyed by the separated bursts. The reference signal from the burst synchronized signal source is applied to the phase shift circuit 33 which applies a plurality of reference signals at prescribed phases to the *R—Y* demodulator 34, *B—Y* demodulator 35 and the *G—Y* demodulator 36.

The color television signal is applied to the chroma filter and amplifier 37 which filters out the chrominance signal or chroma from the color television signal and applies the resultant chroma signal simultaneously to the *R—Y* demodulator 34, the *B—Y* demodulator 35 and the *G—Y* demodulator 36. Each of the aforementioned demodulators may utilize, for example, demodulator circuits of the type described by Pritchard and Rhodes in their publication entitled, "Color Television Receiver Signal Demodulators," June 1953 issue of the RCA Review.

The *R—Y* demodulator 35 drives the amplifier tube 41 which in turn drives the first control electrode 43 of one gun of the electron gun trio 44. The amplifier tube 41 has in its plate circuit, the plate resistor 45 which derives its voltage from the terminal 47 to which is applied a voltage B+. In like fashion, the amplifier tubes 49 and 51 amplify the *B—Y* and *G—Y* color difference signals developed respectively by the *B—Y* demodulator 35 and the *G—Y* demodulator 36. The amplified *B—Y* color difference signal is applied from the anode resistor 53 of the amplifier tube 49 to the first control electrode 55 of the second electron gun of the electron gun trio 44. The amplified *G—Y* color difference signal is applied from the plate resistor 57 of the amplifier tube 51 to the first control electrode 59 of the third of the electron guns in the electron gun trio 44. Each of the amplifier tubes 49 and 51 derives its plate voltage from a power supply which supplies B+ to the terminals 63 and 65, respectively.

In accordance with the present invention, the condenser 71 couples the amplified *R—Y* color difference signal from the first control electrode 43 to the screen grid 73 of the first electron gun of the electron gun trio 44. Condenser 75 is used to couple the amplified *B—Y* color difference signal from the first control electrode 55 to the screen grid 77 of the second electron gun of the electron gun trio 44. The condenser 79 is used to couple the amplified *G—Y* color difference signal from the first control electrode 59 to the screen grid 81 of the third electron gun of the electron gun trio 44. Each of the screen grids 73, 77 and 81 derive their voltage from the voltage divider network 83 which supplies a voltage of desired magnitude between the voltage B+ and the voltage B++ which is larger in amplitude than the voltage B+. The control of the magnitudes of the voltages applied to the screen grids 73, 77, and 81 is provided by the potentiometers 93, 95, and 97 which are included in the voltage divider network 83. It follows from the circuit of Figure 2 that according to the present invention, the *R—Y* color difference signal is applied to both the first control electrode 43 and the screen grid 73 of the first electron gun of the electron gun trio 44. The *B—Y* color difference signal is applied to both the first control electrode 55 and the screen grid 77 of the second electron gun of the electron gun trio 44. The *G—Y* color difference signal is applied to both the first control electrode 59 and the screen grid 81 of the third electron gun of the electron gun trio 44.

The color television signal representing luminance or Y information is applied to the Y amplifier and delay line 91, which applies the amplified and delayed luminance or Y signal simultaneously to each of the cathodes of the electron guns of the electron gun trio 44. Each electron gun in the electron gun trio 44 adds the luminance information to the color difference signal information applied to that electron gun so that the electron gun beam issuing from that gun is modulated by component color information related to the applied color difference signal.

The performance of a color kinescope 24 connected according to the present invention has been found to provide approximately 30% greater highlight on the kinescope phosphors than can be realized when the color difference signal is applied to only one color electrode in the corresponding electron gun.

The color television receiver of Figure 2 provides A.-C. coupling from the control electrodes to the screen grids in each of the electron guns of the electron gun trio 44. The D.-C. components in the chrominance signal can be enhanced by utilizing a circuit of the type shown in Figure 3. The circuit of Figure 3 is a diagram of a color television receiver wherein circuits and components performing the same functions as those circuits of Figure 2 are assigned the same numerals.

Figure 3:
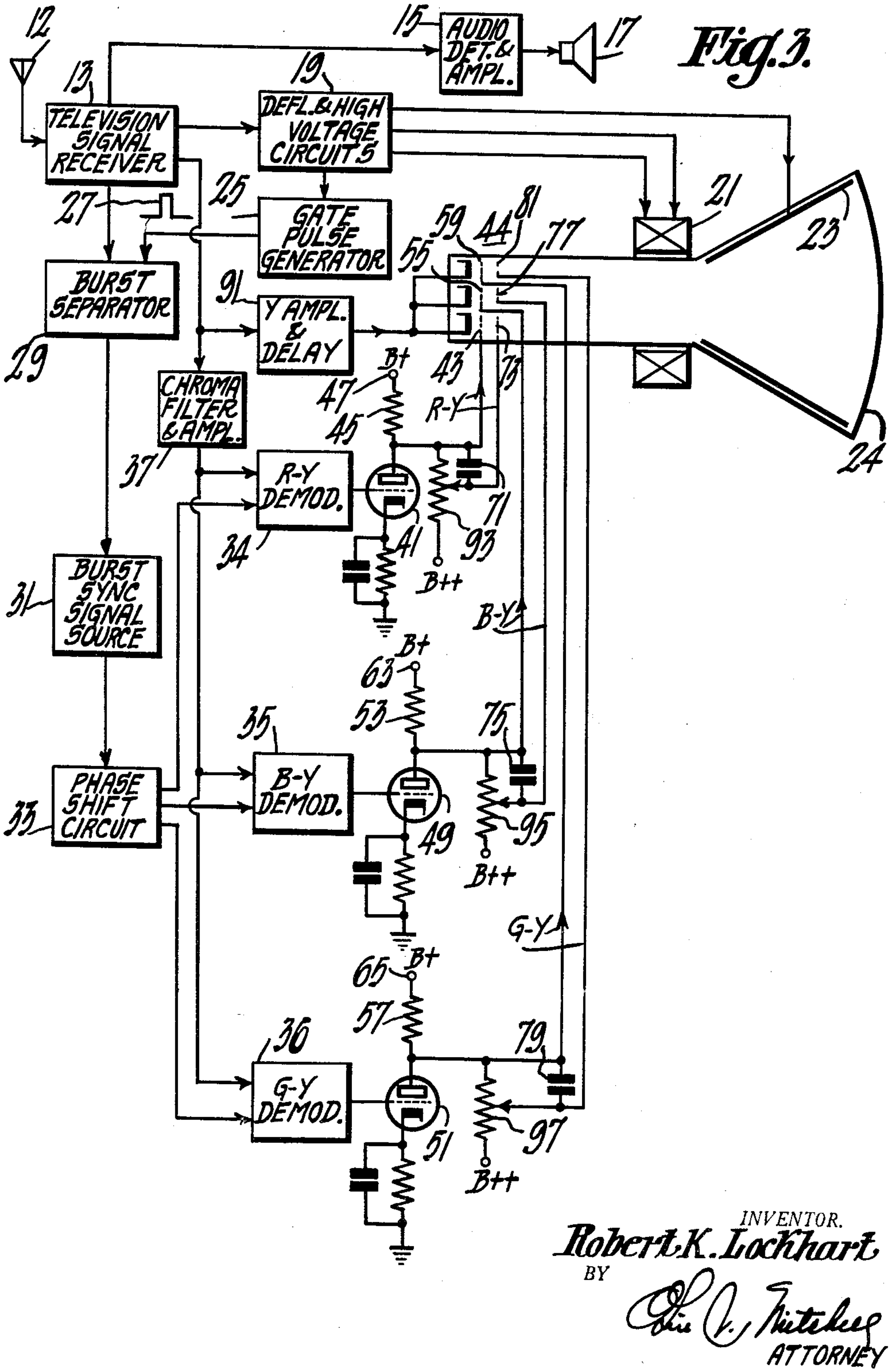

In the color television receiver of Figure 3, the potential applied to, say, the screen grid 73 of the first electron gun of the electron gun trio 44 is derived from the potentiometer 93 which is coupled between the B++ source and the anode of the amplifier tube 41. In like fashion, the screen grids 77 and 81 derive potentials respectively from the potentiometers 95 coupled from the source of B++ to the anode of tube 49, and the potentiometer 97 coupled between the source of B++ and the anode of amplifier tube 51. By use of connections of this type, the D.-C. component of the chrominance signal may also be introduced as modulation by the screen grid into the electron beam of the corresponding electron gun; this is due to the fact that both the A.-C. and D.-C. components of the color difference signals are also developed across the corresponding potentiometers 93, 95 and 97 in addition to being developed across the plate resistors 45, 53 and 57. The circuit of Figure 3 will particularly aid the developing of a color-information D.-C. component in the electron beam of the electron gun of the electron gun trio 44 to which is applied the Y and *R—Y* signals since it has been found in practice that the chroma drive is greatest and the screen voltage is lowest at this electron gun for optimum operation of the color kinescope 24. The circuit of the present invention shown in Figure 3 is self-compensating since the lower the screen voltage used, the greater the percentage of D.-C. component developed on the screen grid. This is desirable since the electron gun with the lowest screen grid voltage shows the greatest differential transconductance ($g_m$) between grid and cathode and hence receives the largest benefits from coupling the color difference signals to the screen grids.

Having described the invention, what is claimed is:

1. In a color television receiver adapted to receive a color television signal including a luminance signal and a chrominance signal, the combination of, means to derive a trio of color difference signals from said chrominance signal, a color kinescope having a trio of electron guns each having a cathode, a control electrode and a green grid, means to apply said luminance signal to the cathodes of each of said electron gun, and means to apply each of said trio of color difference signals to both the control electrode and the screen grid of a different one of said trio of electron guns.

2. In a color television receiver adapted to receive a color television signal including a luminance signal and a chrominance signal, the combination of, means to demodulate a plurality of color difference signals from said chrominance signal, a color kinescope having a group of electron gun each having a cathode, a control electrode and a screen grid, means to apply color information including said luminance signal derived from said color television signal to said cathodes of said group of electron guns, means to apply each of said plurality of said color difference signals to the control electrode of a different one of each of said group of electron guns, and coupling means for coupling the color difference signal applied to the control electrodes of each of said group of electron guns to the screen grid of that electron gun.

3. In a color television receiver adapted to receive a color television signal including a luminance signal and a chrominance signal, the combination of, means to demodulate a plurality of color difference signals from said chrominance signal, a color kinescope having a group of electron guns each having a cathode, a control electrode and a screen grid, means to apply color information including said luminance signal derived from said color television signal to said cathodes of said group of electron guns, means to apply each of said plurality of said color difference signals to the control electrode of a different one of each of said group of electron guns, and condenser means for applying the color difference signal applied to the control electrode of each of said group of electron guns to the screen grid of that electron gun.

4. In a color television receiver adapted to receive a color television signal including a luminance signal and a chrominance signal, the combination of, means to demodualte a plurality of color difference signals from said chrominance signal, each of said plurality of color difference signals having both alternating current and direct current components, a color kinescope having a group of electron guns each having a cathode, a control electrode and a screen grid, means to apply color information including said luminance signal derived from said color television signal to said cathodes of said group of electron guns, means to apply each of said plurality of said color difference signals to the control electrode of a different one of said group of electron guns, and capacitance coupling means for coupling the alternating current components of the color difference signal applied to the control electrode of each of said group of electron guns to the screen grid of that electron gun, and resistor means coupled between the control electrode and screen grid of each electron gun to which a color difference signal is applied to couple the direct current components of said color difference signal to said screen grid.

References Cited in the file of this patent

UNITED STATES PATENTS

| | | |
|---|---|---|
| 2,573,777 | Sziklai | Nov. 6, 1951 |
| 2,722,563 | Loughlin | Nov. 1, 1955 |